United States Patent [19]

Kuehnle et al.

[11] Patent Number: 4,468,707
[45] Date of Patent: Aug. 28, 1984

[54] HIGH SPEED IMAGING OF ELECTROPHOTOGRAPHIC FILM BY FINE BEAM SCANNING

[75] Inventors: Manfred R. Kuehnle, Lexington, Mass.; Lysle D. Cahill, Dayton, Ohio

[73] Assignee: Coulter Systems Corporation, Bedford, Mass.

[21] Appl. No.: 382,628

[22] Filed: May 27, 1982

Related U.S. Application Data

[60] Division of Ser. No. 153,689, May 27, 1980, Pat. No. 4,427,999, which is a continuation of Ser. No. 803,575, Jun. 6, 1977, abandoned.

[51] Int. Cl.³ .............................................. H04M 1/30
[52] U.S. Cl. .................................. 358/300; 358/285; 358/290; 358/297
[58] Field of Search ............... 358/300, 297, 298, 299, 358/290, 285, 286

[56] References Cited
U.S. PATENT DOCUMENTS 3,816,659 6/1974 Landsman ........................... 358/290
3,823,276 7/1974 Maslowski et al. ................. 358/290
4,131,916 12/1978 Landsman ........................... 358/290

Primary Examiner—Howard W. Britton
Assistant Examiner—Edward L. Coles
Attorney, Agent, or Firm—Silverman, Cass & Singer, Ltd.

[57] ABSTRACT

Half-tone xerography involving high speed charging of a limited region of an electrophotographic member and subsequent high speed discharging as by writing with a fine laser beam upon the limited region of the electrophotographic member, the beam being modulated with recordable intelligence from stored digital data. The member is mounted for rotary and axial movement relative to both charging unit and an axial movement beam directing unit. The member support for the member holds the member in a cylindrical or partially cylindrical form with the photoconductive coating inside. The member as a unit and a charging device and writing device as a unit are mounted for relative axial and rotating movement at high speed to enable charging and imaging of the limited regions in a continuous progressive manner.

13 Claims, 6 Drawing Figures

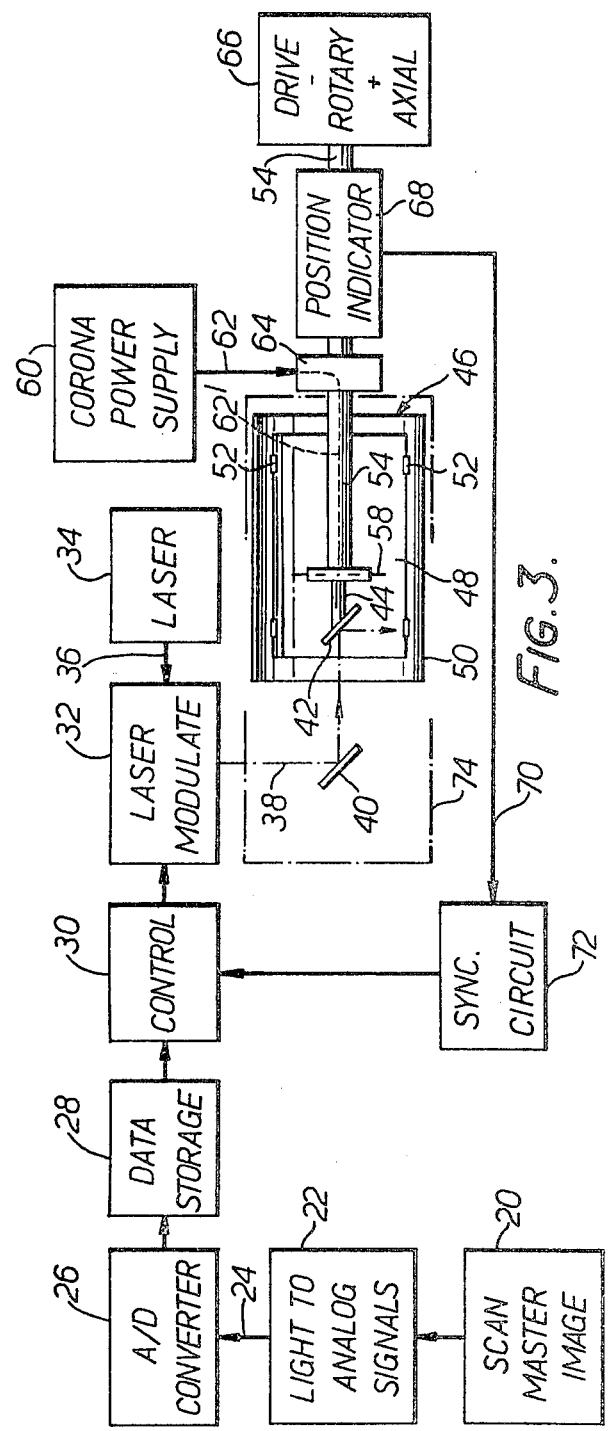
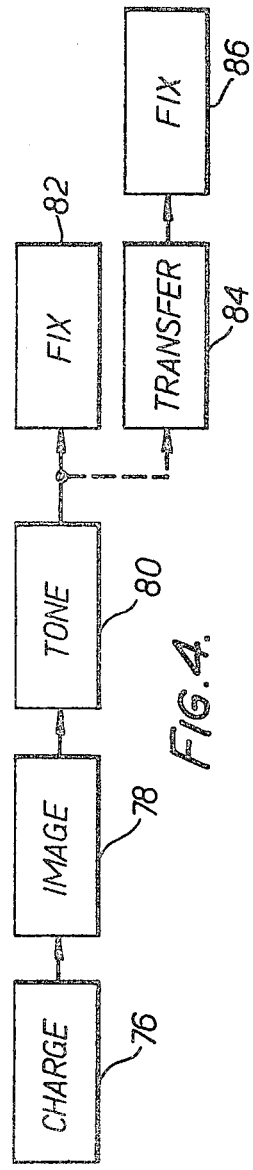
FIG. 3.
FIG. 4.

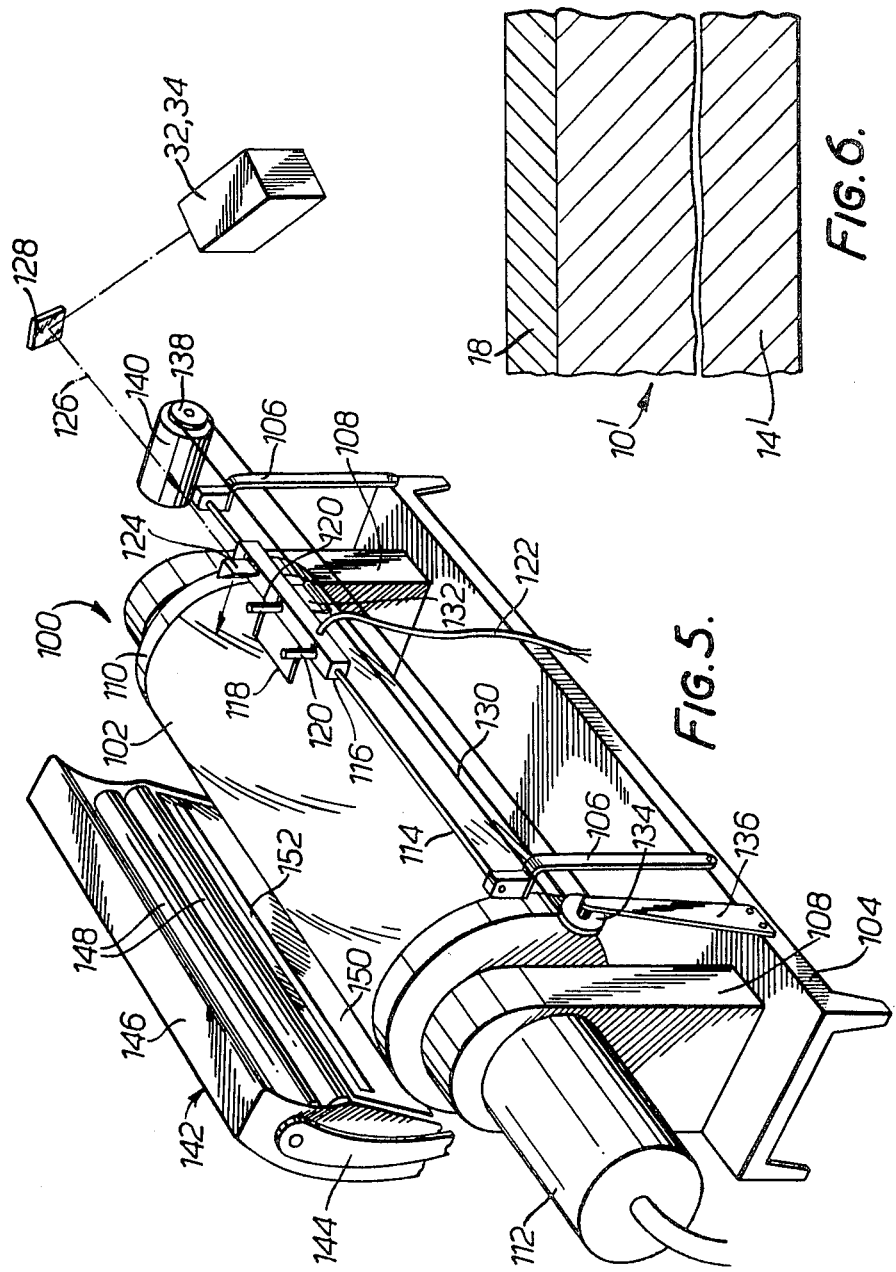

HIGH SPEED IMAGING OF ELECTROPHOTOGRAPHIC FILM BY FINE BEAM SCANNING

This is a division of application Ser. No. 153,689 filed May 27, 1980 now U.S. Pat. No. 4,427,999 which is a continuation of application Ser. No. 803,575 filed June 6, 1977, now abandoned.

FIELD OF THE INVENTION

The field of the invention is the high speed imaging of electrophotographic film members by a synthesizing process using data which has been acquired by scanning a master image. The imaging is effected by charging the electrophotographic member and thereafter building the reproduced latent image through a form of scanning technique in which the master image is reproduced using the same scanning pattern. Additionally it is feasible to reformat from an original and produce a different image with the same content, as for example in the case of text. The latent image is achieved through the use of radiant energy beams of very fine diameter. Thereafter the latent image is developed by toning and fixing or by toning, transfer and fixing.

BACKGROUND OF THE INVENTION

The invention will be described as intended for the production of printing plates for offset or other types of printing, but is not so limited. The application of the invention to printing plate manufacture is advantageous because of the requirement for printing that there be dots or other geometric shapes formed on the plate which will hold or repel ink as in the technique which is familiarly known as ben day screen printing. Obviously the production of a visible image through the use of dots or the like which are so fine that they cannot be resolved by the naked eye is advantageous for fields other than printing because the data representing an image can be conveniently stored compactly and called up at will.

At the outset it should be understood that the electrophotographic medium or film of the invention is disclosed in U.S. Pat. No. 4,025,339 which is owned by the assignee of this application and comprises the invention of one of the applicants herein. The scanning of a master image by a laser or fine light beam and its conversion into binary signals for the production of printing through the use of a moving ink jet is disclosed in U.s. Pat. No. 3,604,846 of which one of the applicants herein is a coinventor.

It is believed that the invention herein is unique in that the ability to apply information onto an electrophotographic member at extremely high speed and with a resolution that is many orders better than ink jet printing, for examples, arises from an unobvious combination. Known commercially available electrostatic media comprising amorphous selenium members and zinc-oxide-resin paper cannot be imaged at high speeds of the order of microseconds at low energy and have not been available or considered useful for this purpose by those skilled in the art. The electrophotographic film of the invention, besides having many advantages that are not possessed by available electrophotographic materials, can be imaged in several nanoseconds which means that the image can be applied at extremely high speed and with high resolution.

Considering the use of high energy beams of light, as for example, laser beams, the principal problems which have frustrated their use in attempts to image electrophotographic members have been (a) the slow speed of available electrophotographic members, (b) the inability to prevent light scatter and the low resolution, (c) the inability of known media to discharge completely coupled with the need for extremely high energy beams to achieve a degree of discharge which can approach absence of charge needed for clean imaging.

The commercially available paper member which uses as a photoconductor zinc-oxide-resin and the amorphous selenium drum cannot achieve high speed imaging, crisp images, high resolution, complete discharge. In order to be able to do any imaging, the laser beam used would have to have energy that calls for high powered lasers and would produce a beam that is likely to burn the material. It is not known that any success has been achieved with these two media, but even complete success would not provide a transparent electrophotographic member that is flexible, archival in quality, robust and tough in construction and capable of being used directly as a printing plate.

The electrophotographic film of the invention has such a high quantum gain that in the visible spectrum for the most part the absorption of a single photon will cause the discharge of approximately more than one electron at the blue end of the spectrum and almost one electron in the green-yellow center so that the energy required of a laser beam which is writing on a charged surface is extremely low. The speed of this film is such that it can respond to charge or discharge in nanoseconds, which is a necessity if the imaging is to be done at high speeds. For example, if a large area of an electrophotographic member is required to be imaged, as in the manufacture of newspaper printing plates, the difference between about two or three minutes and an hour at low energy which would be required to image other media is intolerable. Furthermore, if the imaging of other media additionally produces a resolution equivalent to only a few lines per millimeter as compared to from 8 to 16 lines per millimeter, the use of laser techniques with electrophotography is not justified. In the case of the invention, a cylinder 100 centimeters in circumference of the electrophotographic material of the invention is capable of being imaged with a resolution of at the minimum 8 lines per millimeter at the rate of about 25 centimeters per minute. It is estimated that the equivalent imaging of a zinc oxide or selenium member would require substantially more time and the resolution could not be achieved which is capable of being achieved with the invention.

Considering the ability of the different media to respond to laser beams or fine pencils of light, in the case of the electrophotographic film of the invention complete discharge of the film can be achieved using energies of the order of microwatts. The same size beam for imaging selenium of zinc-oxide-resin must have energies of the order of milliwatts and even watts in some cases, placing important and stringent qualifications on the type of laser that can be used. Zinc oxide paper is actually finely ground particles of zinc oxide in a matrix of organic resin and this material requires as much energy to image as required for many photographic films, and does not produce a transparent member as can be achieved with photographic film.

Speaking of photographic film, it is known to image the same with laser beams. The thickness of the emulsion in photographic film is of the order of fifty times the thickness of the thin film coating of the film of the invention; hence the laser beam scatters internally in photographic film and prevents the achievement of fine resolution. Photographic film is processed chemically and a good deal of its sensitivity is represented by the manner in which it is processed, but its original speed is related to grain size. The faster the film the larger the grain size. A compromise must be made between the speed of writing the information onto the film and the eventual size of grain. Laser beams are capable of being modulated by accousto-optical devices at very high speeds. For example, laser beams can be turned on and off in 20 nanoseconds. No known commercial photographic film is capable of being imaged at this speed with the same resolution as the invention, and certainly not with a beam that has energy as low as microwatts.

Another aspect of the imaging of photographic film is concerned with resolution, especially where the tones of an image are dependent upon the fidelity of dots and their placement. The particles of silver which are precipitated in the processing of silver halide film grow in a more or less haphazard manner so that the uniform morphology of dots, for example, projected onto the film is not preserved. This affects the crispness and the resolution of images.

The film of the invention is anisotropic optically in that there is no scatter of light when the laser beam strikes the coating, the incident beam penetrating and discharging in a depth less than half a micron. The crystalline structure has internal reflection and does not scatter normally in incident light. The latent image is formed at or on the surface, and subsequent toning responds only to the sharpness of the surface latent image.

With respect to resolution, mention made of 8 to 16 lines per millimeter is a matter of practicality for the manufacture of a printing plate in a short time. The only limitation to the resolution capability of the film of the invention is the size of the incident radiant energy beam and the size of the smallest information center in the film. With respect to the former, it is feasible to produce beams of light with lasers and the like that are of the same order as the crystallite size of the electrophotographic film of the invention. With toner particles smaller than this size, which is of the order of 700 Angstroms, the theoretical resolution of the film of the invention is over 10,000 lines per millimeter.

The laying down of a latent image with high resolution is only one criterion of successful imaging. Another which is of importance is the preservation of the image until the electrophotographic member has been developed by toning for example. In the intervening time the charge gradient of the latent image is capable of being dissipated due to migration of charge. In the case of the film of the invention, the medium has electrical anisotropy which is represented by an extremely high resistivity laterally and a low resistivity when discharge occurs transversely, i.e. through the thickness, of the photoconductive coatings. The surface resistivity is of the order of $1 \times 10^{17}$ ohms per square and higher, it being unlikely that there will be any migration of the charge as there is in the case of selenium and zinc oxide. Selenium owes its usefulness to a very high surface resistivity in darkness, but this is not different from its resistivity transversely so that as soon as an image is formed the charge slowly migrates. It also has a tendency to concentrate the toner where the charge gradient is the greatest, that is at places where high and low charge exist side by side. Thus, images have a tendency to have their borders darker than other locations and have the centers of dark areas light instead of solid. This is not met in the film of the invention.

Mention made above with respect to total discharge is related to the need for clean backgrounds in the development of images that are composed of dots or other geometric shapes. If there is incomplete discharge as is the case of selenium members, upon toning, the smaller toner particles tend to gather in the areas which are supposed to be colorless and destroy the fidelity of the resulting image. As stated, the film of the invention is completely discharged so that the background has no vestigial or remaining charge to attract toner. This is essential where the film is to be used to make a printing plate or, as in the case of the invention, will comprise the printing plate.

The photographic film of the invention had as one of its important attributes the ability to be discharged incrementally so as to achieve varying degrees of surface charge whose potential was proportional to the degree of darkness of the original or master image which was being reproduced. Considerable effort was exerted to utilize this attribute. On this account, it was known that an important factor in achieving an eventual image was the control of toning time to achieve the proper grey scale. Processing was thus considered critical.

According to the invention, grey scale is achieved by the number of dots and for high quality, their placement in a given incremental area with respect to other areas. Each dot is saturated, that is, as black as possible. The processing is not critical. All that is required is to match the toner to the minimum voltage which is achieved during the laser writing. The time required for writing a complete image need only be limited by the voltage chosen as the minimum, this being the dark decay voltage. There are only two types of incremental areas in the latent image, namely those comprising dots whose voltages are above the minimum voltage established for toning and those areas which have no surface potential at all. The dots thus are all saturated and when toned will have an absolute toned value relative to the suround which would normally be dead white (in the case of black and white toning). It has been found that the film of the invention is ideal for this type of imaging since it is capable of being absolutely toned at very low voltages, say of the order of ten volts and less, while also being capable of total discharge in areas alongside of the toned increments.

It will be appreciated that the electrophotographic film of the invention was not originally intended to be used in this manner, i.e., where its superior abilities to exhibit gradients of charge for achieving grey scale are not utilized.

SUMMARY OF THE INVENTION

A method of imaging through the use of electrostatic techniques comprising the scanning of a master image with a beam of radiant or other energy and converting the light and dark portions into data which is stored in digital form electrically. Thereafter the data is written onto an electrophotographic film at high speed, the film having a photoconductive coating which is microcrystalline, wholly inorganic, is a thin film coating less than a micron thick, being optically and electrically anisotropic, having high quantum gain. The writing is effected by a fine beam of radiant energy that is modulated in accordance with the stored data to produce discrete dots of discharge or charge at least whose number in a given increment of area determines the greay scale, the dots being laid down with a surface voltage that will tone absolutely in saturation.

Apparatus is provided for high speed imaging comprising the means for reading the master image and storing the data, means for converting the data into discrete bundles of photons for writing purposes, means for directing the bundles of photons in a fine beam onto a surface of an electrophotographic member capable of responding at high speed and capable of total discharge from the areas which have the bundles directed at them, and means for scanning the fine beam in the same manner that the original reading beam was scanned on the master image to produce a latent image equivalent to the master image but in dot or other geometric form. Processing means in the form of a toning mechanism and the like may be provided.

BRIEF DESCRIPTION OF THE DRAWINGS

FIG. 3 is a block diagram of the apparatus of the invention and including a diagrammatic representation of the writing structure;

FIG. 4 is a block diagram showing the functions contemplated through the use of the invention to produce images;

FIG. 5 is a perspective view, more or less diagrammatic in nature, illustrating another form of the invention; and FIG. 6 is a fragmentary sectional view through the wall of a cylinder of metal having a sputtered photoconductive coating bonded to its outer surface.

DESCRIPTION OF THE PREFERRED EMBODIMENTS

Figure 1:
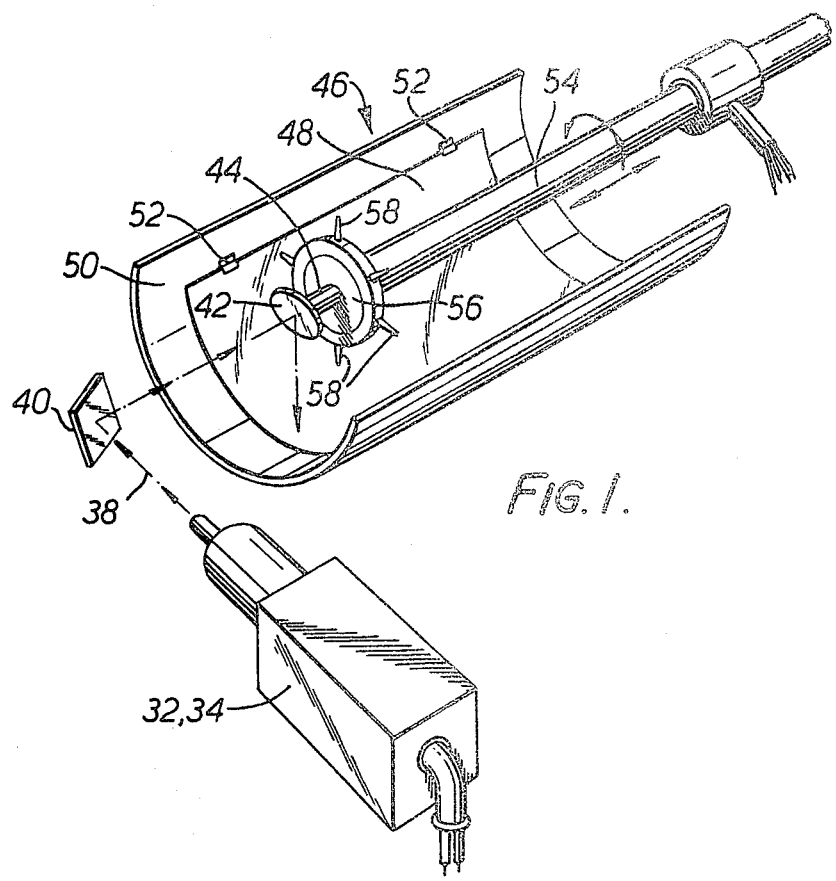
FIG. 1 is a perspective view, more or less diagrammatic in nature, illustrating some of the apparatus for practicing the invention.

As stated, the invention will be described in connection with the requirements for making a printing plate, but it is not so limited. The basic invention is believed to be much broader than that, covering the method and apparatus for achieving imaging by digitally modulating a beam of radiant energy from information or data carried in a store and writing with the beam upon an electrophotographic film or sheet member that has special attributes that work in concert with the beam. The invention revolves around the discovery that the particular electrophotographic member is ideally suited for use with the modulated fine beam when applied in a manner not originally intended.

The requirements for imaging in accordance with the invention to achieve the results of high resolution, extended grey scale and the other benefits which are discussed herein are first, that the surface potential of the electrophotographic film being imaged is required to exceed a certain voltage which may be of the order of 6 to 10 volts, second that the energy of the fine beam of radiant energy doing the writing must be sufficeint to discharge the illuminated charged surface of the electrophotographic film to zero without damaging the film and leaving the non-illuminated parts fully charged, and third that the toner and the toning process must tone the charged areas absolutely, that is in saturation.

For comment on the above three points, which are not the exhaustive requirements, it should be pointed out that the surface potential of all commercial electrophotographic members other than the one which is the subject matter of the U.S. Patent mentioned above when fully charged is in the vicinity of 600 volts, consequently requiring extremely high radiant energy to discharge the same. At that is is impossible fully to discharge the same. In the case of laser beams, the laser is required to have extremely high energy to produce a fine beam capable of effecting the maximum discharge. In the case of the film of the invention, when fully charged the potential of the surface is of the order of 30 volts, and yet the electric field is at least one order greater than the field of the ordinary selenium drum. When charged, the dark decay commences, and after some period of time in the electrophotographic film of the invention may be as low as 6 to 10 volts and still provide sufficient voltage to enable saturation toning. The selenium photoconductors and zinc oxide papers never discharge to the value of 10 volts, always having a residual "noise" voltage which is of the order of 40 or so volts.

With respect to the energy of the beam, since very low energies, of the order of microwatts are sufficient to discharge the film of the invention small, economical lasers can be used and are easily modulated by acoustical-optical devices. The type of beams needed to discharge other photoconductive materials or to image silver halide film would burn holes in the film of the invention.

With respect to toning, the toner is required only to saturate the dots and hence there is no criticality in toning. Time of toning is not related to the grey scale produced.

Figure 2:
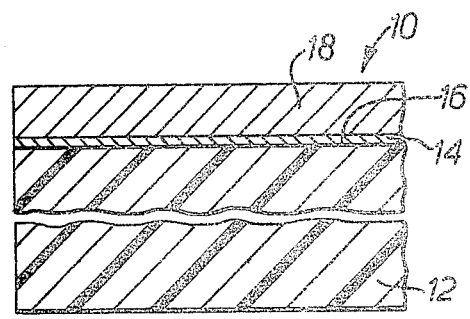
FIG. 2 is a fragmentary sectional view through a member of electrophotographic film for use with the invention.

The electrophotographic film of the invention is shown in section in FIG. 2, the same comprising a material which is produced by radio frequency sputtering under certain conditions as explained in said U.S. Pat. No. 4,025,339. The material 10 is based upon a substrate 12 comprising a synthetic resin sheet material of a polyester type such as manufactured by DuPont, Celanese or Kalle as a very stable, transparent, tough, flexible film extruded in various thicknesses. The preferred substrate is of the order of a fraction of a millimeter in thickness. A thin film layer of ohmic material 14 is sputter deposited onto the surface of the substrate 12, the ohmic layer comprising preferably an alloy of indium oxide and tin oxide in the ratio of about nine to one. The thickness is between about 100 Angstroms and 500 Angstroms to be conductive and yet quite transparent. A bonding layer 16 of a few Angstroms of cadmium sulfide may be sputtered onto the substrate before laying down the ohmic layer 14. The upper coating 18 is the photoconductive material, being sputtered also and having a thickness of the order of 3000 Angstroms. Other thicknesses are usable, but generally they are substantially less than a micron.

It is practical to sputter the coating 18 directly onto a sheet of metal for imaging conditions that do not require transparency of the substrate, thereby eliminating the need for a separate substrate 12. In FIG. 6 such an electrophotographic member 10' is illustrated comprising the same type of coating 18 deposited on a sheet member 14' that serves as ohmic layer and substrate at the same time. The sheet metal member 14' may be foil or rolled sheet from several microns to a millimeter thick and be fabricated from aluminum, nickle, stainless steel or alloys of these or other metals. The problem of grounding the middle ohmic layer 14 of the member 10 is eliminated since it is a simple matter to contact layer 14'. Furthermore, the heat resistant properties of metal are very much better than polyester so that sputtering heat, imaging heat and fixing heat pose no problems.

The invention encompasses a system wherein the member 10' is a seamless, continuous cylinder to be mounted on a mandrel for imaging and supported in a printing press for printing as will be explained in connection with FIG. 5.

The preferred material for the photoconductive coating is pure cadmium sulfide, which may be selectively doped with copper or carbon or the like to improve the response at the red end of the spectrum. The coating when deposited in the manner detailed in the said U.S. Pat. No. 4,025,339 results in a photoconductor which is made of hexagonal crystallites of cadmium sulfide having very uniform morphology, vertically oriented and displaying single crystal characteristics in testing with electronic beams. There is a very thin barrier layer on the surface which has a surface resistivity of the order of $10^{17}$ to $10^{20}$ ohms per square whether in light or darkness and whether charged or discharged. In the bulk and transversely, the coating exhibits electrical anisotropy, the resistivity in darkness when charged being of the order of $10^{15}$ ohm centimeters and in light being substantially less in the ratio of about $10^4$. The coating is extremely smooth on its surface and preserves the morphology of toner which is applied and fixed or transferred. It is abrasion-resistant and since the entire member 10 itself is less than a millimeter thick, the material is highly flexible. It can thus be passed around rollers easily and is not likely to get scratched in passing through machinery. The member 10' is capable of being made with a total thickness of less than a millimeter and hence can also be very flexible.

The crystalline structure has no internal scattering and hence does not diffuse light which is directed into it normally during writing as happens in the case of all other known electrophotographic members having thicknesses which are very much greater or, as in the case of photographic films, emulsions which diffuse light.

The electrophotographic film has a quantum gain which is very high, resulting in the production of at least one electron for each absorbed photon thereby providing a very substantial gain mechanism. The member can be charged or discharged at speeds of the order of nanoseconds. The best electrophotographic members known today cannot be charged and discharged at speeds of this degree, and still retain the charge if not illuminated for periods of time of the order of minutes to a degree which still provides sufficient potential for saturation toning.

The high surface resistivity means that there is no loss of charge gradient through migration or edge effect when the surface is toned. Each of the crystallite tips acts as an independent field domain, and since the crystallites are about 700 Angstroms in diameter, the limit of resolution is beyond any known electrophotographic member and depends only upon the size of particles in the toner.

In FIG. 3 there is illustrated a system for imaging by means of a radiant energy beam, which is in this instance a laser beam. The block 20 is representative of a device which can scan a master image such as a document, photograph, paste-up or the like. This device can be mechanical or electrical or a combination of both. The information which is acquired by the scanning, which could be for example a light beam of very fine diameter, is transmitted to a device which converts the variations of beam intensity into electrical analog signals. For example, the device could comprise a photoresponsive device such as a photoelectric cell or a photomultiplier. The block 22 represents this device. The resulting output from the device 22 is a stream of electric signals at 24 which are analog in nature, that is, their amplitude and/or intensity has a relationship with the reflectivity and absorptivity of the master image. If the master image is printed matter, the variegations are produced by different intensities and absence of printing ink. If the master image is a film, the scanning may be done by passing a beam through the film. If the master image is a document there may be typing, writing, etc. on the document. The master may be an electronic image scanned by an electron beam.

The analog signals at 24 are now converted into analog bits which are the equivalent of the analog signals in an A/D converter 26 of any desired type. This may be of any known construction. The resulting data is stored at 28 in a store of a computer. The data may be modified in the computer to provide a program for the writing of the data upon an electrophotographic member, taking into account the number of lines, the length of the lines, the production of dots, the placement of the dots, their relationship with the surrounding data, and even the size of the dots.

The data storage block 28 represents an important part of the computer which may also include control circuitry as represented by the block 30. This latter block, however, could comprise an interface device which enables the control of the entire system to be directed from a single location outside the physical computer.

Up to this point, the data in the store 28 has been passing in a stream into the store 28 without regard to the remainder of the system. The system can be deenergized after scanning the master image and the information preserved indefinitely as for example on tape or disc or in other storage elements in the store 28 until needed. There may be facilities for accumulation of multiple sets of data from many different master images before use or there may be a simultaneously accumulation of a plurality of sets from the same master image as in the case of color reproduction in which there is a separation of colors through the use of filters and/or by time sharing of the respective colors.

The block 32 is a laser modulating device of any suitable type, for example, an acousto-optic deflector modulator as manufactured by Isomet Corporation (U.S.A.). The laser itself is represented by the block 34, its beam 36 being directed to the modulating device 32 that is in turn controlled to produce a fine stream of discrete bundles or bursts of photons at 38, reflected by the fixed mirror 40 onto the rotating mirror 42 mounted on the shaft 44. The rotating mirror 42 and shaft 44 are a part of a writing device 46 that carries a rectangular member 48 of the electrophotographic material 10 or 10' described above in connection with FIGS. 2 and 6 in an arcuate trough 50 of metal to which the ohmic layer 14 is grounded, as for example through clips 52 which hold the member 48 in position. In the case of a member 10' grounding is effected directly to the mandrel.

The member 48 is highly flexible and readily conforms to the interior cylindrical surface of the trough 50, being positioned therein with its photoconductive coating 18 exposed. The shaft 44 is an extension of the shaft 54 which is arranged coaxially with the curvature of the interior of the trough 50. It carries a small wheel 56 that has a plurality of radially extending needles 58 mounted about its periphery in spaced arrangement. The needles 58 comprise corona generating means operating in conjunction with a corona power supply 60 that is coupled to the needles 58 through the connection indicated at 62 in FIG. 2 through a slide-ring-wiper device 64 mounted on the shaft 54. The connection extends up the hollow of the shaft 54 as indicated by the broken line 62' in FIG. 3 to the wheel 56. The wheel 56 may be made of insulating material, for example, having an annular peripheral metal ring mounting the needles 58 to which the line 62' is connected.

The shaft 54 is rotated by a suitable drive 66 and at the same time moved axially so that it can write the beam 38 along the entire length of the member 48 in a single pass. The apparatus 46 is set into operation when the wheel 56 and the mirror 42 are located at the extreme left end of the member 48, the wheel 56 being located in a position so that it will start at or beyond the left hand edge of the member 48. As the shaft 54 rotates, the wheel 56 rotates and the needles 58 spray corona onto the surface of the member 48 charging the same. Simultaneously the shaft 54 is translated axially to the right as viewed in FIGS. 1 and 3 rotating the mirror 42 and also translating it. The space between the mirror 42 and the wheel 56 is fixed at a distance which is close enough so that there will be a uniform charge available to be written upon and so that the beam 38 is not so close to the wheel 56 as to have the beam and corona overlap. This will normally be determined by the umbra of the corona but can be a few centimeters. The construction of the corona mechanism will determine this distance.

It can be appreciated that the mirror 42 will reflect the beam 38 through 360° of rotation in a structure of this kind and that if the data from the store 28 is continuously fed through the control there will be a portion lost for each half revolution of the shaft 54. Accordingly, the control 30 is arranged to discontinue the feeding of data for the portion of the revolution during which the mirror 42 reflects the beam 38 away from the member 48. Any suitable sensing device 68 associated with the shaft 54 senses the circumferential disposition of the shaft and hence the position of the mirror 40. This information is passed by way of a line 70 to a synchronizing circuit 72 operating in conjunction with the control structure 30 to delay the passage of data to the laser modulating device 32 for each portion of the revolution of the shaft 54 that the mirror 42 is not reflecting the beam 38 directly onto the member 48.

When the entire surface 18 of the member 48 has been imaged in darkness, the apparatus 46 being completely enclosed by a suitable light excluding cabinet indicated symbolically at 74, the member 48 may be toned in place or removed and toned in a separate piece of apparatus. This entire process is indicated in the functional diagram of FIG. 4, where the first block 76 indicates the charging of the member 48, the next block 78 indicates the writing or imaging of the member by the mirror 42, the next block 80 indicates the toning of the member, and the last block 82 indicates the fixing of the member 48. Fixing is done either by heat or chemically or may be inherent in the type of toner. With the member 48 in fixed condition it can be converted into a printing plate by suitable treatment to render the toned and untoned portions ink accepting and ink rejecting, respectively. One technique is disclosed in a copending application, Ser. No. 632,590 filed Nov. 17, 1975, and assigned to the assignee of this application. Certain types of toned images may not require such treatment.

Alternatively, the member 48 may be used as a transparency after fixing if based upon a transparent substrate as 12. As another alternative, the member 48 may be processed by bringing it into contact engagement with a receptor such as paper, polyester or the like indicated by the block 84 to transfer the toned image to the receptor. Thereafter the receptor may be fixed as indicated at 86.

An alternative form of the invention which eliminates the need for the rotating mirror 42, the use of a corona wheel 56, the axial movement of the shaft 54 and the need for synchronizing the operation of the laser modulator 32 with the productive portion of the mirror rotation is shown in FIG. 5.

The device 100 of FIG. 5 is intended for imaging a cylinder of the electrophotographic film which is indicated at 102. This can either be a cylinder formed by joining the ends of a rectangular member of electrophotographic film 10 or 10' or an integral seamless cylinder of the electrophotographic film 10' which has been formed by sputtering the material upon a tubular metal member of the substrate 14' preformed for this purpose. The device includes a base 104 having end standards 106 and 108 mounting a cylindrical mandrel 110 journalled therein and driven by a high speed motor 112. A guide or track 114 is mounted parallel with the mandrel 110 upon suitable brackets 116 that are mounted on the base 104. A carriage 116 is mounted for sliding movement along the guide 114 having a corona wire 118 stretched between a pair of posts 120 mounted on the carriage 116 and energized from a suitable corona power source through the cable 122. At the end of the carriage 116 opposite the corona wire 118 there is mounted a reflecting prism 124 which is aligned with and receives the beam 126 of modulated light reflected from the laser device 32, 34 by the mirror 128. The carriage 116 is connected to one reach of a wire loop 130 by a coupling member 132, the wire loop being engaged over an idler roller 134 carried on a bracket 135 mounted to the base 104 and wrapped around a drive wheel 138 adapted to be rotated by a suitable motor 140.

The entire structure is enclosed in a suitable enclosure which enables the process of charging, writing and toning to be carried on in darkness. The same structure used in connection with the system of FIG. 3 is useful to read the master image and then write the same image upon the cylindrical sleeve 102. In use the wire 118 charges the cylinder 102 a portion at a time and immediately thereafter the beam 126 images the cylinder with the discrete bundles or bursts of photons designed to apply the dots or other regular geometric shapes of charge or absence of charge in forming the latent reproduction of the master image. The ohmic layer 14 or 14' of the mounted member 102 is grounded.

After imaging, it is convenient to have a movable toning device 142 which can be swung into position on the arms 144 to apply toner to the latent image. As shown here the toner device has a hood 146 with several rollers 148, a plate 150 and a slot 152 all of which are the general type of means that can be used to apply liquid toner, remove the excess, bias the liquid to remove extraneous particles of toner, apply rinse, etc. No specific structure is intended to be shown for the toning device 142, and it should also be pointed out that the remainder of the components of the imaging device 100 of FIG. 5 are illustrated more or less diagrammatically. The parts are obviously required to be constructed to provide for many functions which would be advantageous from an engineering standpoint and to enable convenient use of the invention. For example, the mandrel 110 may be constructed so that it can readily be removed from its journals to enable the sleeve 102 to be mounted thereto and removed therefrom; the guide 114 and its mountings as well as the wire loop 130 should be located so as not to interfere with the attachment and removal of the sleeve 102 and hence may be arranged to be swung into and out of position as mentioned for the toning device 142; controls are required for starting up, stopping, and synchronizing the operation of the motors 112 and 140 to integrate with the operation of the entire system; etc.

Likewise considerable electrical connections and cables are not shown in FIG. 5 or in FIG. 1.

After toning and fixing, the latter being readily effected by a simple heating operation, the sleeve 102 can be removed from the apparatus 100, treated to render the image ink-receptive and its background ink-repellant. The resulting cylinder is now capable of being installed in an offset printing press as a printing cylinder.

Variations are capable of being made without departing from the spirit or scope of the invention as embodied in the appended claims.

For example, instead of charging the photoconductive surface progressively a portion at a time, it is feasible to charge the entire length of a cylinder or half cylinder of the electrophotographic material using a fixed elongate corona wire or other independently mounted corona producing means arranged axially and capable of applying the charge the entire length in one revolution of the support. No axial movement of the corona means would occur. It would normally be considered impractical to do this because the surface potential along the length of the member 48 or 102 would be uniform when charged but progressively less along the length as the carriage 54 or 116 with the beam directing means only moves along such length. The reason for the decrease is that the dark decay will be greater the longer it takes for the carriage 54 or 116 with beam directing means only to reach any axial position. It would follow from what is known that the latent image would have a variable average surface potential along its length, with a consequent unsatisfactory toned image.

The reason this concept is practical is that the invention enables the toning to be saturated and only depends upon the charging increments exceeding a certain critical voltage. The only requirement for perfect production of a tonable latent image in such example therefore, is that the surface voltage at the end of writing be greater than the critical voltage by a value that provides for a slight additional decrease between the completion of the writing process and the beginning of the toning process. The maximum axial length of any given electrophotographic member can be determined easily by measuring decrease of surface potential in the time required to write along the entire length and adjusting parameters so that the requirement described above is met.

It is preferred to charge and write with the use of moving carriages which have both charging and beam directing means as disclosed herein so that there is no concern of dark decay decreasing too far for a given length of electrophotographic member.

The use of the phrase "master image" in the claims is intended to signify an actual image, data that is being generated on real time without first actually forming an image computer generated data derived from a store or produced by artificial methods or the like. No limitation is intended, the phrase "master image" being used only for convenience.

What it is desired to secure by Letters Patent of the United States is:

We claim:

1. Apparatus for high speed imaging of an electrophotographic material comprising:

A. means for scanning a master image with a reading beam of energy that can be modulated in accordance with said optical variations of the master image and in accordance with a predetermined scanning pattern, B. means for converting the modulations into a stream of electric signals, C. means for converting the stream of electric signals into a fine writing beam of radiant energy with modulations related to the modulations of the reading beam, D. means mounting a member of electrophotographic material in darkness comprising a photoconductive coating capable of accepting and discharging a charge at high speed and formed of a thin film, transparent, microcrystalline, electrically and optically anisotropic, high quantum gain, wholly inorganic material, E. means for charging a limited region of the coating of the member in darkness progressively at high speed to a surface charge potential capable of being fully discharged by said writing beam in accordance with the modulations thereof, F. means for directing the writing beam successively to impact onto the charged limited region of the coating in darkness for discharging said charged limited region, G. means for effecting high speed relative movement between the mounting means and directing means in a manner which causes the writing beam substantially to reproduce the said predetermined scanning pattern whereby to reproduce an overall latent charge image formed of regular geometric shapes consisting of an array of charged spot areas of said surface and fully discharged spot areas of said surface, each spot area being respectively equal to the area of each impact area of the fine beam with the charged spot areas of the surface having the same dark decay rate so that substantially all the charged spot areas within the latent charged image retain their charge value subject only to dark decay rate, the charged and discharged areas being distributed in an array reproducing said predetermined scanning pattern representative of said master image, H. means for developing said overall latent image subsequent to complete formation thereof, I. said charging means constructed to charge only a limited region of said coating at a time, J. said directing means comprising a movable carriage having a beam deflector for pointing the writing beam directly to the coating from a point on said carriage, and said charging means including a corona producing device mounted on said carriage spaced from said point in a direction which will bring the corona producing device progressively into proximity with each limited region of the coating before the writing beam impacts upon same, but at a rate the same as the scanning rate, K. said mounting means comprising a support holding said electrophotographic member in a cylindrical configuration, L. said carriage being arranged to move axially along the length of the electrophotographic member while at the same time the carriage and member are rotatably movable one relative to the other, M. said carriage is movable on a line coaxially of the electrophotographic member, N. said photoconductive coating being on the inside of the cylindrical configuration and, O. said carriage being rotatable on the axis defined by said coaxial line.

2. The apparatus as claimed in claim 1 in which the electrophotographic member is a partial cylinder of generally part circular cross section.

3. Apparatus for high speed imaging of an electrophotographic material comprising:

A. means for scanning a master image with a reading beam of energy that can be modulated in accordance with said optical variations of the master image and in accordance with a predetermined scanning pattern, B. means for converting the modulations into a stream of electric signals, C. store means for receiving said stream of electrical signals, D. means for converting the stream of electric signals from said store means into a fine writing beam of radiant energy with modulations related to the modulations of the reading beam, E. means mounting a member of electrophotographic material in darkness comprising a photoconductive coating capable of accepting and discharging a charge of high speed and formed of a thin film, transparent, microcrystalline, electrically and optically anistropic, high quantum gain, wholly inorganic material, F. means for charging of a limited region of the coating of the member in darkness progressively at high speed to a surface charge potential capable of being fully discharged by said writing beam in accordance with the modulations thereof, G. means for directing the writing beam successively to impact onto the charged limited region of the coating in darkness progressively immediately subsequent to charging of said limited region substantially fully to discharge said limited region, H. means for effecting relative movement between the mounting means and directing means at high speed to cause the writing beam substantially to reproduce the said predetermined scanning pattern whereby to reproduce an overall latent charge image formed of regular geometric shapes consisting of an array of charged limited regions of said surface and substantially fully discharged limited regions of said surface, each fully discharged limited region being respectively equal to the area of each impact area of the fine beam with the remaining charged limited regions of the surface having the same dark decay rate so that substantially all the charged remaining limited regions within the overall latent charged image are capable of retaining their charge value subject only to dark decay rate, the charged and discharged limited regions being distributed in an array reproducing said predetermined scanning pattern representative of said master image, and I. means for developing said overall latent image subsequent to complete formation thereof said directing means comprising a movable carriage having a beam deflector for pointing the writing beam directly to the photoconductive coating from a point on said carriage, said charging means including a corona producing device mounted on said carriage spaced from said point in a direction which will bring the corona producing device progressively into proximity with each portion of the photoconductive coating before the writing beam engages the same, but at the same scanning rate, said mounting means holding said electrophotographic member in a cylindrical configuration, the photoconductive coating of the member is on the inside of the cylindrical configuration, said carriage being arranged to move along a line coaxially of said electrophotographic member along the length thereof with simultaneous relative rotational movement of the carriage and electrophotographic member and the carriage is rotatable on the axis defined by said line.

4. The apparatus as claimed in claim 3 in which the electrophotographic member is a partial cylinder of generally part circular cross section.

5. In an apparatus for high speed imaging of an electrophotographic material in which there is a source of data that is in binary form and which represents the information capable of being developed into a master image, a radiant energy device having a fine beam of discrete bursts of energy derived from the source and capable of producing the master image if used to write the fine beam upon a suitable responsive medium, the invention herein which comprises means for effecting such production and including:

A. an electrophotographic member including a photoconductive coating capable of accepting and discharging a charge at high speed, B. means for charging a limited region of the coating of the member in darkness progressively at high speed to a surface potential capable of being adapted substantially fully discharged by said fine beam, C. means adapted to receive said beam and direct the same onto the charged limited region of said photoconductive coating in darkness progressively at high speed, D. means mounting the electrophotographic member in darkness, E. means for effecting relative movement at high speed between the mounting means and the directing means in a form of movement adapted to cause any said beam received to engage against and scan the coating for substantially fully discharging only selected limited regions of impact of said fine beam in accordance with the master image, the remaining charged limited regions discharging in darkness in accord with the same dark decay rate for producing an overall latent image of said master image, and F. means for developing the overall latent image formed.

6. The invention as claimed in claim 5 in which the charging means are arranged to move to charge a limited region of the coating at a time at high speed and progressively charge the entire coating while the last-mentioned relative movement is taking place but the charging means being located in a position relative to the directing means such that the charging of any given limited region of the photoconductive coating occurs before said beam will engage said limited region.

7. The invention as claimed in claim 6 in which the charging means are constructed to charge the entire coating progressively but only a limited region at a time, a movable carriage is provided with the charging means and directing means both mounted on said carriage spaced apart and said means for effecting relative movement comprise driving means for moving the mounting means and carriage relative to one another with the carriage disposed in such a manner that any given limited region will be charged before the beam engages the same.

8. The invention as claimed in claim 7 in which the mounting means comprise a support holding said electrophotographic member in a cylindrical configuration and in which means are provided to move the carriage axially along the length of the electrophotographic member while at the same time the carriage and member are moved rotatably one relative to the other.

9. The invention as claimed in claim 8 in which means are provided to move the carriage on a line outside of the cylinder defined by the electrophotographic member, the photoconductive coating of the member is on the exterior of the cylindrical configuration and the mounting means are rotated.

10. The invention as claimed in claim 8 in which means are provided to move the carriage on a line coaxially of the electrophotographic member, the photoconductive coating is disposed on the inside of the cylindrical configuration and the carriage is rotated on an axis defined by said line.

11. The invention as claimed in claim 9 in which the electrophotographic member is a complete cylinder.

12. The invention as claimed in claim 10 in which the electrophotographic member is a partial cylinder of generally part circular cross section.

13. The invention as claimed in claim 12 in which the directing means comprise an angled mirror mounted on said axis and rotating with said carriage, and the invention further includes means to discontinue the beam for that part of each revolution that the beam is reflected away from the photoconductive coating.

* * * * *